United States Patent [19]

Bruce

[11] Patent Number: 4,669,662
[45] Date of Patent: Jun. 2, 1987

[54] MOBILE SPRAY APPARATUS

[76] Inventor: James D. Bruce, P.O. Box 456, Newton, Ala. 36352

[21] Appl. No.: 812,462

[22] Filed: Dec. 23, 1985

[51] Int. Cl.⁴ .............................................. B05B 1/20
[52] U.S. Cl. .................................... 239/163; 239/126; 239/164; 239/170
[58] Field of Search ............... 239/124, 125, 127, 163, 239/164, 169, 170, 176, 168, 444, 126

[56] References Cited

U.S. PATENT DOCUMENTS

| | | | |
|---|---|---|---|
| 1,005,822 | 10/1911 | Ford | 239/169 |
| 1,526,642 | 2/1925 | Nissley | 239/169 |
| 2,596,390 | 5/1952 | Essick | 239/164 |
| 2,684,865 | 7/1954 | Lattner | 239/168 |
| 2,699,967 | 1/1955 | Edinborough et al. | 239/164 |
| 2,757,044 | 7/1956 | Gerbracht . | |
| 2,759,762 | 8/1956 | Kostka et al. . | |
| 2,772,921 | 12/1956 | Nance . | |
| 3,143,295 | 8/1964 | Booker | 239/164 |
| 3,233,832 | 2/1966 | Hallberg . | |
| 3,270,962 | 9/1966 | Watts | 239/176 |
| 3,301,487 | 1/1967 | Young | 239/168 |
| 3,463,397 | 8/1969 | Mecklin et al. | 239/127 |
| 3,589,614 | 6/1971 | Linville . | |
| 3,940,065 | 2/1976 | Ware et al. . | |
| 3,976,231 | 8/1976 | Betulius | 239/127 |

FOREIGN PATENT DOCUMENTS 579499 10/1924 France .............................. 239/164

*Primary Examiner*—Andres Kashnikow
*Assistant Examiner*—Michael J. Forman
*Attorney, Agent, or Firm*—Harvey B. Jacobson

[57] ABSTRACT

A mobile liquid spray apparatus comprises a wheeled frame of lightweight but sturdy construction which may be propelled manually over the ground or may be towed by a towing vehicle. The frame includes a height-adjustable horizontally extending spray boom, an attachment for a pair of vertical spray booms and a self-contained liquid supply system for delivering liquid under pressure selectively to the respective spray booms. The liquid supply system comprises a liquid supply tank on the frame, and a battery driven pump for delivering liquid under pressure from the tank selectively to the spray booms through a manually settable three-way valve. The system also includes a pressure regulator valve and pressure gauge for adjusting the spray pressure. The device may also include an auxiliary hand-held spray gun which may be used in place of one of the spray booms.

5 Claims, 9 Drawing Figures

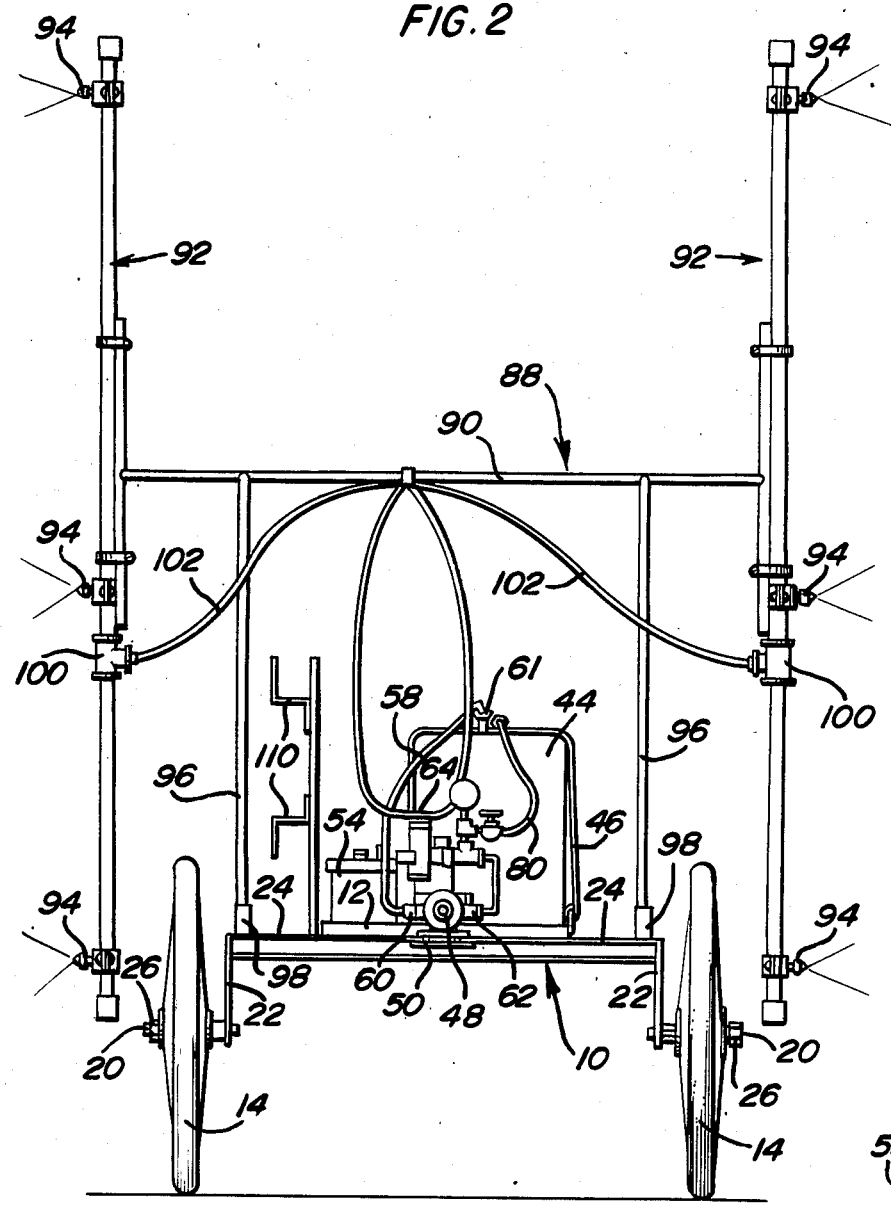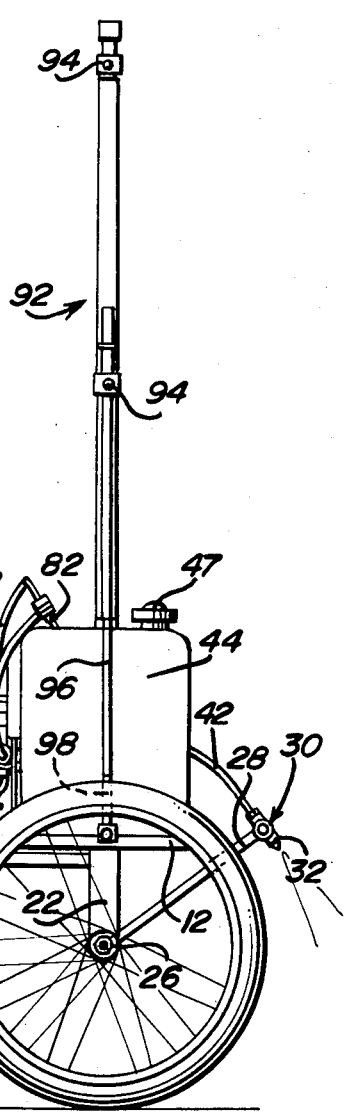

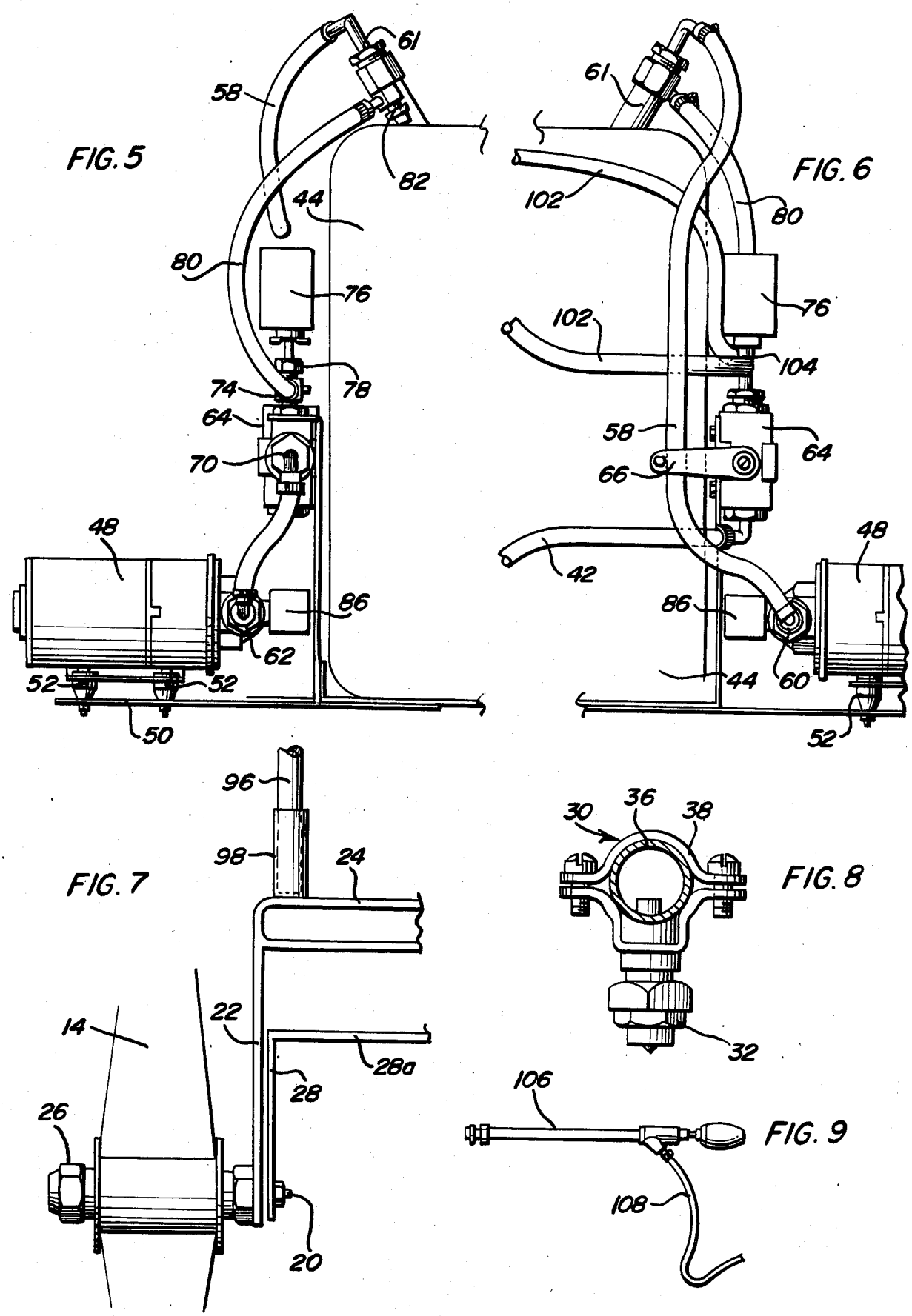

MOBILE SPRAY APPARATUS

BACKGROUND OF THE INVENTION

This invention relates to a mobile spray device for use in a diversity of applications, such as the chemical spraying of crops, fruit trees, flower gardens or the like, and which is also suitable for spraying farm buildings such as barns or the like for cleaning purposes.

More particularly the invention relates to a lightweight yet sturdy wheeled spray device which can be pushed or pulled by hand, but which can also be hitched to a towing vehicle, such as a tractor, the device having a self-contained liquid tank and pumped liquid delivery system, and offering a variety of spray patterns, orientations, and directions.

SUMMARY OF THE INVENTION

A mobile spray device in accordance with the invention comprises a wheeled frame of lightweight but sturdy tubular construction on bicycle-type wheels with inflatable tires, the frame carrying spray apparatus including a liquid supply tank, at least one spray boom with an array of spray nozzles for receiving liquid from the tank, and a battery-operated pump for delivering liquid under pressure from the tank to the spray boom through suitable control means and the like. In a preferred form of the invention, the spray boom may be adjustably mounted in rear of the frame so as to extend horizontally behind the wheels, and the device may include an optional attachment incorporating left hand and right hand vertically disposed spray booms for selective connection into the pumped liquid system to provide a facility, for example, for spraying opposed rows of fruit trees and the like. An auxiliary selectively attachable hand-held spray attachment may also be provided. The front of the frame may be formed as a hitch for attachment to a towing vehicle, such as a tractor, but the frame is preferably light enough also to be pulled by hand, and may include an operating switch in the front for energizing the pump.

The spray controls may, for example, include a pressure regulator valve and pressure gauge whereby spray pressures may be selectively adjusted up to about 50 psi, and flow rate can also be adjusted.

The invention thus provides an adaptable and versatile mobile spray device primarily intended for home and garden use for spraying liquids such as herbicides, pesticides, liquid fertilizers and the like, but which can also be used on farms for example, for similar purposes, or for cleaning animal quarters and the like.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 2 is a rear elevational view of the apparatus.

FIG. 3 is a side elevational view of the apparatus.

FIG. 5 is a left hand side elevational view of the assembly.

FIG. 6 is a right hand side elevational view of the assembly.

FIG. 7 is a rear elevational view of a wheel assembly.

FIG. 8 is a sectional elevational view through a spray nozzle assembly.

FIG. 9 is an overall view of a hand-held spray gun attachment.

DESCRIPTION OF PREFERRED EMBODIMENT

Figure 1:
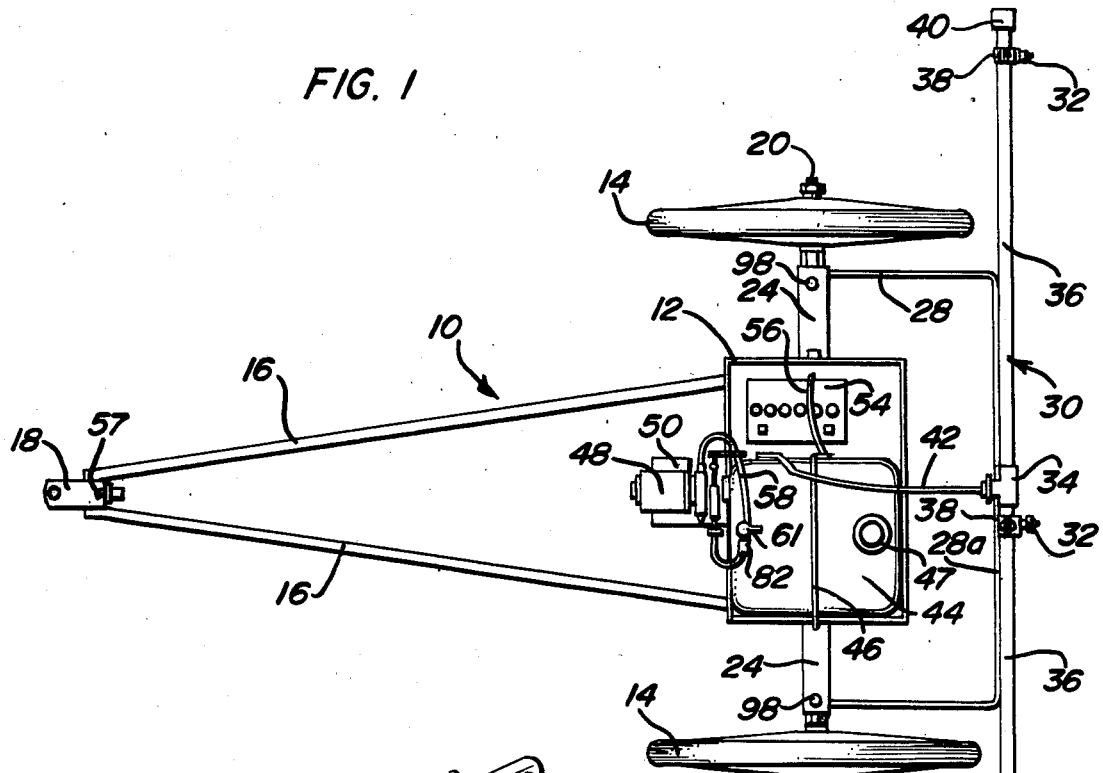
FIG. 1 is a plan view of a mobile spray apparatus in accordance with the invention.
Figure 4:
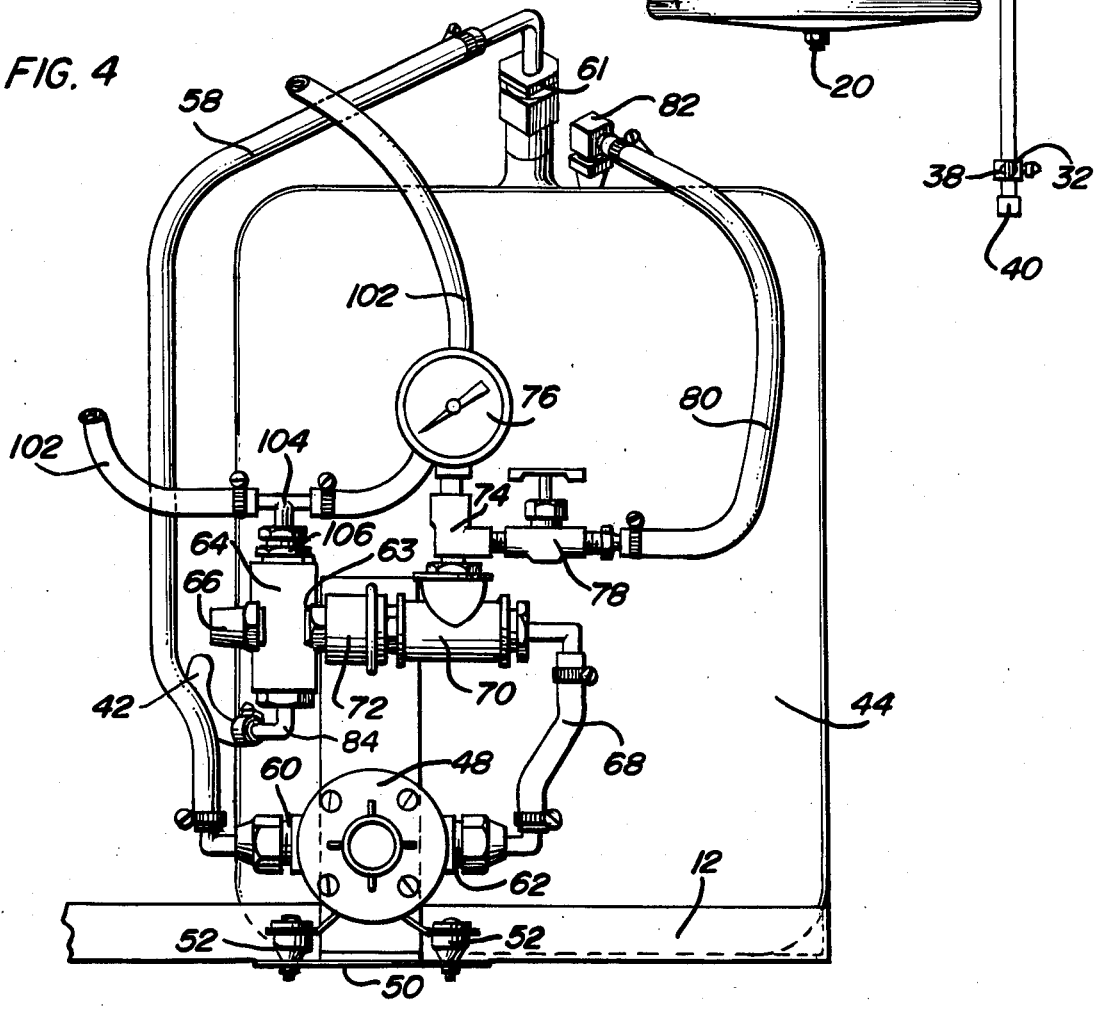
FIG. 4 is an enlarged front elevational view of a part of the apparatus including a pump, spray tank and valve control assembly.

The illustrated spray apparatus comprises a cart assembly 10 in the form of a lightweight frame having a generally rectangular body or pan portion 12 on wheels 14, the frame including forwardly extending elongate are members 16, for example of lightweight tubular metal, connected at their forward ends to a towing hitch plate 18 or the like.

Wheels 14 may comprise 26 inch bicycle-type wheels with inflatable tires, and may be mounted on suitable axles 20 carried in limbs 22 depending from brackets 24 extending laterally from the body portion 12 of the frame. The wheels may be removably mounted on the axles with suitable locknuts and washer assemblies, generally indicated at 26, being provided for the wheels.

The frame may be provided with a generally U-shaped bracket 28 pivotally interconnected between limbs 22 for mounting a horizontal spray boom 30 provided with a series of spray nozzles 32. The bracket may be adjustably mounted on the limbs 22 by suitable bolt-and-nut connectors allowing the angle of inclination of the bracket to be adjusted so as to alter the height of the spray boom 30 and the angle of the nozzle sprays. The spray boom may comprise lengths of PVC pipe 36 extending from a central T-fitting 34 suitably clipped or otherwise secured to the cross member 28a of bracket 28. The spray nozzles may be mounted in suitable openings in the pipes and secured by nozzle brackets 38. The pipes may have end caps 40 and the T-fitting may be connected into a liquid supply for the sprays (to be described below) by a flexible hose 42. The nozzles may be of a conventional type construction for emitting a suitable crop spraying or like spray pattern.

The liquid supply system for supplying liquid under pressure to nozzles 32 may include a liquid supply tank 44 secured on body portion 12 of the frame by a securing strap 46, the tank for example having a capacity of anywhere from 10 to 50 gallons, and being provided with a vacuum relief-filling orifice cap 47, and a self-priming rotary pump 48 mounted on a bracket 50 attached to body 12, with resilient shock-absorbing mounts 52, the pump being actuated by means of a 12 volt rechargeable automobile-type or like battery 54 also secured on body portion 12 of the frame by a suitable strap 56 or the like. A control switch 57 for the pump may be mounted on hitch plate 18 to facilitate control of the pump when the apparatus is being wheeled manually.

Liquid from tank 44 is, for example, delivered to the inlet 60 of pump 48 through a hose connection 58 extending from a tank discharge assembly 61 which may include a discharge tube (not shown) extending internally to the base of the tank, and which may include a filtration screen or the like. The outlet 62 of the pump may be connected to the inlet 63 of a three-way valve 64 having a manual control lever 66, via a hose connector 68, a T-fitting 70, and an adapter 72. T-fitting 70 is connected to a elbow 74, one limb of which is associated with a pressure gauge 76 and the other limb of which is connected to a pressure regulating valve 78 leading through a hose connector 80 back into tank 44 through a fitting 82. One of the outlets 84 of th three-way valve 64 is connected with hose 42 for supplying liquid to nozzles 32 on spray boom 30. Thus, when outlet 84 is connected with inlet 63, by means of lever 66, liquid under pressure may be delivered to the nozzles with valve 78 being useful for regulating the pressure of the sprayed liquid up to the maximum pump delivery pressure, which may be about 50 psi. Reference 86 represents a pump motor modulating valve.

The apparatus may further include a vertical spray boom attachment generally indicated at 88 comprising an attachment frame 90 and opposed vertical spray booms 92 with nozzles 94, each of the vertical booms being of generally similar construction to spray boom 30. Frame 90 may have legs 96 releasably received in socket fittings 98 on brackets 24 enabling the entire frame and vertical booms to be attached to the apparatus and detached as required. The central T-fittings 100 of the respective booms 92 may be connected into the liquid supply system through hoses 102 connected to a T-fitting 104 attached to the second outlet of three-way valve 64. Thus, by swinging of lever 66, liquid may be directed either to the horizontal spray boom 30 or to the vertical spray booms 92. The entire vertical spray boom attachment may be removed when not in use.

The apparatus may also be provided with a hand-held spray gun 106 (FIG. 9) with a delivery hose 108 of suitable length, which may be connected to either one of the outlets for the three-way valve 64 in place of one of the spray boom hoses. A hose bracket 110 may be provided on the frame for receiving hose 108 when it is not in use.

The spray apparatus is of a strong but lightweight construction and is extremely versatile in its use and applications. It can be pulled by hand or can be easily maneuvered by a small or large garden or other tractor. The apparatus has sufficient ground clearance to spray any vegetable garden using the horizontal spray boom which can be pivoted to a more upright position for spraying peach orchards and the like. Liquid can be dispensed at any desired rate from one-half pint per minute up to three gallons per minute, and the unit can be used to spray most any type of liquid. While the primary purpose of the apparatus is for home and garden use for spraying herbicides, pesticides, liquid fertilizer and the like, it can also be used to spray dairy barns, horse barns and in other frame applications. The auxiliary spray gun hose can be most any length, for example 30 to 40 feet, and the spray gun can dispense liquid in a spray of a fog or mist type, a distance from about 10 feet for a fogger to about 35 feet with an open jet.

The 12 volt pump can deliver liquid at up 50 psi with automatic demand control to permit the pump to operate only when liquid flow is required. The pump stops instantly when the discharge valve is closed to preserve pump life. Loss of flow to the priming chamber will not cause damage to the pump. There is no metal contact with liquid being pumped. Ball bearing throughout the pump and motor assure long pump life. The pump has excellent self-priming capacity and may be located above the liquid level.

The apparatus can spray trees up to 35 to 40 feet in height, and can spray higher with the use of a stepladder. The spray boom can be adapted to use up to six spray nozzles. When spraying a small garden from a few rows up to two or three acres, the unit can easily be pulled by hand. It can be pulled by hand across a lawn to spray the lawn or can be pulled into dairy barns, or horse barns for easy access to the individual stalls and roof areas of the barn where flies and insects may gather. Further, different spray orifices can be used on the spray booms for different applications. The control valve and pressure gauge afford a continuous accurate and uniform spray application readily observed by the operator.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as new is as follows:

1. A lightweight mobile spray apparatus comprising a frame carried on a pair of bicycle-type wheels having a common rotational axis, the frame including elongate hitch members extending to a hitch plate at a foward end of the frame for propelling the frame manually over the ground or for connecting same to a towing vehicle, the frame having a body portion between the wheels, a liquid supply tank on the body portion of the frame, a vertically adjustable horizontally extending transverse spray boom mounted on the frame behind the body portion, the spray boom including a plurality of spaced spray nozzles, said horizontal spray boom being mounted on a bracket having arms connected to the frame at a point in alignment with the wheel axis and extending radially outwardly beyond the periphery of the wheels for pivotal movement in an arcuate path about an axis corresponding to the wheel axis whereby the height of the boom and inclination of the spray nozzles may be adjusted, left and right hand vertically extending spray booms on an attachment releasably mounted on the frame substantially over the wheel axis and inwardly of the wheels, the attachment having arms carrying the vertical spray booms in positions laterally outwardly of the wheels and generally in alignment with the wheel axis, and liquid delivery means for selectively delivering liquid under pressure to the horizontal sray boom and to the vertical spray booms, the liquid delivery means comprising a pump on the body portion of the frame, means for driving the pump on the body portion of the frame, conduit means connecting the pump inlet to the liquid supply tank, further conduit means connecting the pump outlet to the respective spray booms through a manually operable diverter valve.

2. The invention of claim wherein the apparatus further includes a hand-held spray gun attachment with a liquid delivery hose connectible to said manually operable valve in place of a connection for one of the spray booms.

3. The invention of claim 1 wherein the further conduit means includes a branch conduit upstream of said diverter valve leading back to the liquid supply tank and including a pressure regulator valve and a pressure gauge.

4. The mobile spray apparatus of claim 10 wherein said releasable attachment for the vertically extending spray booms includes a pair of upwardly facing sockets mounted on the frame, said attachment arms comprising a pair of vertical legs having their lower ends received in the sockets and a generally horizontal transverse member interconnecting upper ends of the legs and extending laterally outwardly from the upper ends of the legs with the vertical booms mounted on outer ends of the horizontal member, said vertical spray booms each including a plurality of vertically spaced nozzles with the lower end of the vertical booms extending below the upper periphery of the wheels and disposed outwardly thereof with the spray nozzles being directed outwardly laterally in relation to the apparatus for spraying liquid laterally outwardly of the wheels without interference from the wheels.

5. The mobile spray apparatus as defined in claim 4 wherein said means driving the pump is a battery driven pump motor and battery mounted on the frame with switch means controlling operation of the pump, and a hand held spray gun attachment including a delivery hose for liquid connectable into the conduit means connecting the pump outlet to the horizontal and vertical spray booms on the downstream side of the diverter valve.

* * * * *